July 9, 1946.  J. HILLIER ET AL  2,403,529
ELECTRON MICROSCOPE
Filed April 30, 1942
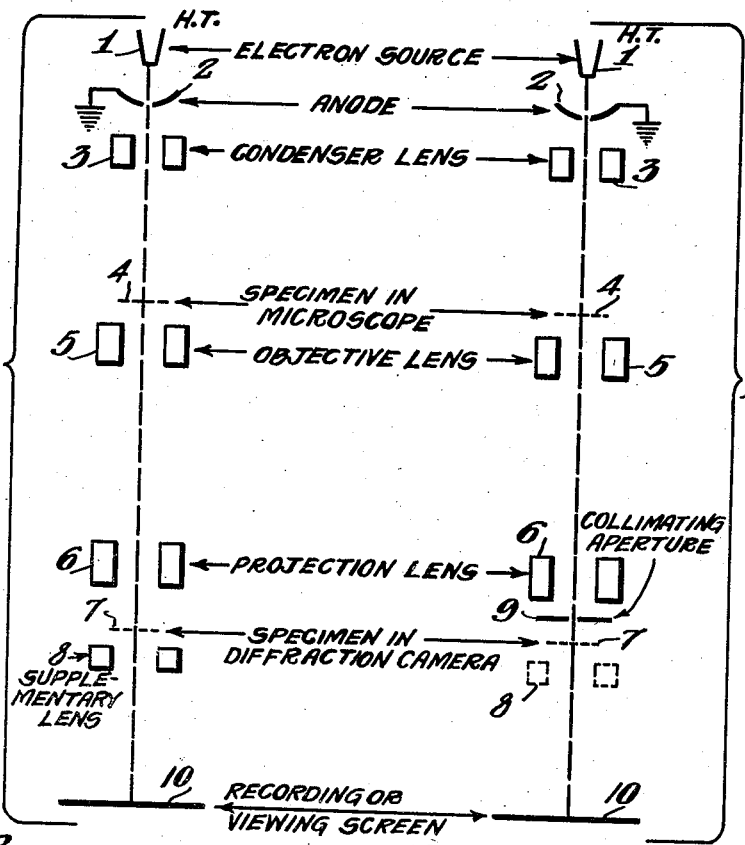
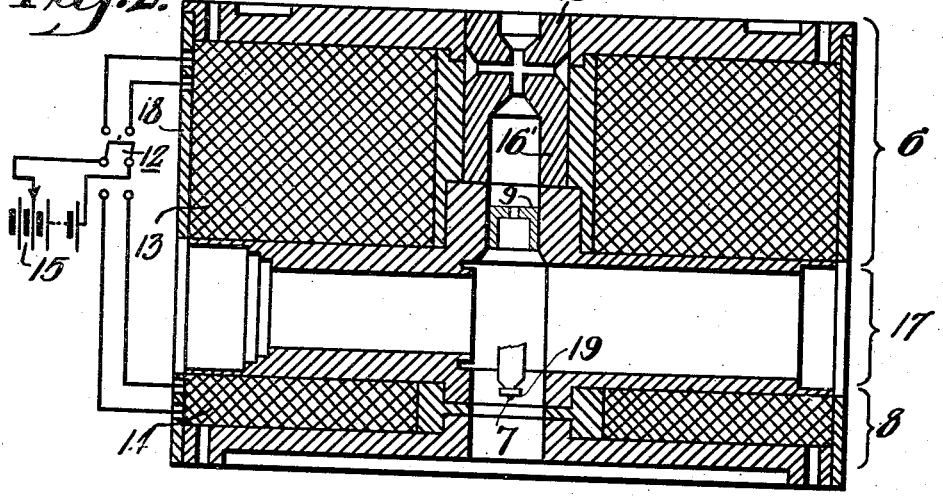

Patented July 9, 1946

2,403,529

UNITED STATES PATENT OFFICE 2,403,529

ELECTRON MICROSCOPE

James Hillier, Collingswood, and Richard F. Baker, Merchantville, N. J., assignors to Radio Corporation of America, a corporation of Delaware Application April 30, 1942, Serial No. 441,142

13 Claims. (Cl. 250—49.5)

This invention relates generally to electron microscopes and particularly to means for converting electron microscopes for use as electron diffraction cameras.

U. S. Patent 2,275,234, granted to John E. Ruedy on March 3, 1942, discloses a method of and means for producing electron diffraction patterns. The instant invention relates to means for converting a conventional electron microscope, utilizing either electrostatic or electromagnetic lenses, to a diffraction camera of the general type disclosed in the above mentioned patent.

The use of a conventional electron microscope for obtaining electron micrographs of a small portion of a specimen is too well known in the art to require detailed discussion. Electrons transmitted through or reflected by a portion of the specimen are focused electrically to provide an enlarged electron micrograph image of said portion, which image resembles a conventional light microscope image.

Electron diffraction patterns and their applications also are well known, and are treated in considerable detail, for example, in "Theory and Practice of Electron Diffraction" by G. P. Thomson and W. Cochrane, MacMillan and Co. Ltd. (1939). Such diffraction patterns comprise predetermined arrangements of concentric circles on an image screen, the relative spacings of the circles being determined by electron diffraction dependent upon the lattice spacings of the atoms of the crystals of the specimen material. They may be correlated with known material diffraction patterns to indicate the chemical composition of the electron irradiated specimen crystals.

It is frequently found desirable to make diffraction measurements on specimens under observation in an electron microscope. Considerable care and time is required to properly mount specimens for electron microscopic observation. The instant invention greatly simplifies this problem by utilizing the same specimens for both microscopic and diffraction observations. To accomplish this result the specimen is placed in the object chamber of the electron microscope for microscopic observation and alternately placed in a second object chamber, in an attachment disposed adjacent to the microscope projection lens, for diffraction measurements.

The device to be described hereinafter includes the conventional electron microscope projection lens, a supplementary object chamber which can be suitably evacuated, and in which the position of the object may be adjusted in the electron beam, and a supplementary lens having a common axis with the projection lens. A preferred modification of the unit is designed to be readily attached to the conventional electron microscope frame.

Among the objects of the invention are to provide means for converting a conventional electron microscope into an electron diffraction camera. Another object is to provide means for observing alternatively a specimen in different object chambers of an electron image device, for producing either an electron image or an electron diffraction pattern of the irradiated specimen. Still another object of the invention is to provide a unitary attachment for an electron microscope which includes the microscope projection lens, a supplementary object chamber and a supplementary lens. Another object is to provide an attachment for an electron microscope which includes the conventional projection lens, a supplementary object chamber and a supplementary lens, in which selective means are provided for energizing either the projection lens or the supplementary lens. Another object is to provide an attachment for a conventional electron microscope comprising a supplementary object chamber and a collimating aperture disposed in proximity to the microscope projection lens, which includes means for deenergizing the projection lens when the specimen is placed in the supplementary object chamber for spectroscopic measurements.

The invention will be described by reference to the drawing of which Figure 1a is a schematic diagram of one embodiment of the invention, Figure 1b is a schematic diagram of a second embodiment of the invention, and Figure 2 is a cross-sectional view of a preferred embodiment of the invention.

Referring to Fig. 1a, the invention includes an electron source 1 which is at high negative potential. An anode 2, at ground potential with respect to the electron source and having a suitable aperture, accelerates and concentrates the electrons emitted from the electron source 1 into a suitable beam. An electron condenser lens 3, which may be of either the electrostatic or electromagnetic type, is disposed in the electron beam between the anode 2 and a conventional object chamber containing a specimen 4. Electrons transmitted by or reflected from the specimen 4 are focused by the objective lens 5 and the projection lens 6 to form an image on the recording or viewing screen 10. The apparatus thus described comprises a conventional electron microscope which may be of the type described in U. S.

Patent 2,206,415, granted July 2, 1940, to Ladislaus Marton. If the apparatus is to be converted for use as an electron diffraction camera, the specimen is removed from the point 4 and placed at the point 7 in proximity to the projection lens 6, and between the projection lens 6 and a supplementary lens 8. Suitable provision is made for deenergizing the projection lens 6 and simultaneously energizing the supplementary lens 8. Under this arrangement an image of the electron source 1 is formed at the recording or viewing screen 10, and the electron diffraction caused by the surface characteristics of the specimen at the point 7 forms an electron diffraction pattern.

The arrangement shown in Fig. 1b is identical to that of Fig. 1a with the exception that instead of the supplementary lens 8, a collimating aperture 9, which may be of the type described in U. S. Patent 2,275,234 mentioned heretofore, is disposed between the projection lens 6 and the supplementary object chamber 7 when the microscope is used as an electron diffraction camera. Similarly the projection lens 6 is deenergized when the apparatus is operated as a diffraction camera.

It is also possible and often desirable to utilize the supplementary lens 8 and the collimating aperture 9 simultaneously, as indicated in Fig. 1b by the inclusion of the lens 8 shown by dash lines.

Fig. 2 is a preferred embodiment of an element of the system described in Fig. 1a. The microscope projection lens 6, the supplementary object chamber 17 and the supplementary lens 8 are combined in any suitable manner to form a device which may be readily connected to the microscope casing, to replace the conventional microscope projection lens assembly. The supplementary object chamber 17 and specimen holder 19 may be any type known in the art, such as, for example, the device disclosed and claimed in U. S. Patent 2,272,843 granted to James Hillier on February 10, 1942, and assigned to the same assignee as the instant application. The projection lens 6 is of conventional design and is comprised of the winding 13 and the pole pieces 16 and 16'. Connections from the winding 13 are brought out of the casing 18 to a switch 12, the movable element of which is connected to a suitable adjustable source of potential 15. The supplementary object chamber 17 is disposed in the path of the electron beam passing through the pole piece 16'. The object chamber may be of conventional design and should include suitable means for adjusting the position of the specimen, for instance, as described in the patent mentioned heretofore, and suitable means for evacuation. The supplementary lens 8, which includes the winding 14, is disposed in coaxial relation to the projection lens 6. The lens 8 should be of suitable design to converge the electron beam and to focus the beam to the smallest possible diameter at the screen 10. Connections from the coil 14 are also made to the switch 12, to provide for alternative energization of windings 13 and 14. It should be understood that electrostatic lenses of conventional design may be substituted for the electromagnetic lenses herein described.

If, instead of the supplementary lens 8, the previously described collimating aperture 9 is used, this may be placed in the path of the electron beam at a suitable point above the object chamber 17. With this arrangement, both of the lenses 6 and 8 may be deenergized when the apparatus is used as a diffraction camera, or, if desired, the aperture may be used in conjunction with the energized supplementary lens 8.

We claim as our invention:

1. An attachment for an electron microscope including, in combination, an electron projection lens, an object chamber and a second electron lens, and means for selectively energizing one or the other of said lenses.

2. An attachment for an electron microscope including, in combination, an electron projection lens for said microscope, and an object chamber and a second electron lens for forming an electron diffraction pattern of an object in said chamber, and means for selectively energizing one or the other of said lenses.

3. An attachment for an electron microscope including, in combination, an electron projection lens, an object chamber and a second electron lens all disposed on a common axis, and means for selectively energizing one or the other of said lenses.

4. An attachment for an electron microscope including, in combination and all disposed on a common axis, an electron lens for said microscope, and an object chamber and a second electron lens for forming an electron diffraction pattern of an object in said chamber, and means for selectively energizing one or the other of said lenses.

5. Apparatus of the type described in claim 4 including a collimating aperture device disposed between said object chamber and the electron source.

6. In combination, an electron image and electron diffraction device including means supported by and located within said device for supporting an object, means for forming an electron micrograph of said object, means for forming an electronic diffraction pattern of said object, common object irradiating means, and common viewing means for observing the desired micrograph or pattern.

7. In combination, an electron image and electron diffraction device including means supported by and located within said device for supporting an object, means for forming an electron micrograph of said object, means for forming an electronic diffraction pattern of said object, common object irradiating means, and common recording means for the desired said micrograph and said pattern.

8. Apparatus of the type described in claim 6 including common recording means for said micrograph and said pattern.

9. In combination with an electron microscope, an attachment including an electron projection lens, an object chamber, and a second electron lens, and means for selectively energizing at least one of said lenses.

10. In combination, an electron image and electron diffraction device including means supported by and located within said device for supporting an object, means for forming an electron micrograph of said object, means including a collimating aperture device for forming an electronic diffraction pattern of said object, common object irradiating means, and common viewing means for observing the desired micrograph or pattern.

11. In combination, an electron image and electron diffraction device including means supported by and located within said device for supporting an object, means for forming an electron micrograph of said object, means including a collimating aperture device for forming an electronic diffraction pattern of said object, common object irradiating means, and common recording means for the desired said micrograph and said pattern.

12. In combination with an electron microscope, an attachment including an electron projection lens, an object chamber, and a second electron lens, a removable collimating aperture device disposed between said projection lens and said object chamber, and means for selectively energizing at least one of said lenses.

13. An attachment for an electron microscope including, in combination and all disposed on a common axis, an electron lens for said microscope, an object chamber and a collimating aperture disposed between said object chamber and said lens for forming an electron diffraction pattern of an object within said chamber, and means for selectively energizing said lens.

JAMES HILLIER.
RICHARD F. BAKER.